(12) United States Patent
Gustafsson et al.

(10) Patent No.: US 9,070,021 B2
(45) Date of Patent: Jun. 30, 2015

(54) MONITORING METHOD AND CAMERA

(71) Applicant: Axis AB, Lund (SE)

(72) Inventors: Daniel Gustafsson, Lund (SE); Willy Sagefalk, Veberod (SE); Jonatan Kahrstrom, Lund (SE); Gustav Traff, Lund (SE)

(73) Assignee: AXIS AB, Lund (SE)

( * ) Notice: Subject to any disclaimer, the term of this patent is extended or adjusted under 35 U.S.C. 154(b) by 73 days.

(21) Appl. No.: 14/077,583

(22) Filed: Nov. 12, 2013

(65) Prior Publication Data

US 2014/0132771 A1 May 15, 2014

Related U.S. Application Data

(60) Provisional application No. 61/726,812, filed on Nov. 15, 2012.

(30) Foreign Application Priority Data

Nov. 12, 2012 (EP) ..................................... 12192217

(51) Int. Cl.
*H04N 7/18* (2006.01)
*G06K 9/00* (2006.01)
*G08B 13/196* (2006.01)

(52) U.S. Cl.
CPC ...... *G06K 9/00771* (2013.01); *G08B 13/19613* (2013.01); *G08B 13/19652* (2013.01); *G08B 13/1968* (2013.01)

(58) Field of Classification Search
CPC .................... G06K 9/00771; G08B 13/19613; G08B 13/19652; G08B 13/1968
USPC ................................................... 348/143, 152
See application file for complete search history.

(56) References Cited

U.S. PATENT DOCUMENTS 6,128,396 A    10/2000    Hasegawa et al.

FOREIGN PATENT DOCUMENTS

JP    2012-032910 A    2/2012

*Primary Examiner* — Allen Wong
(74) *Attorney, Agent, or Firm* — Volpe and Koenig, P.C.

(57) ABSTRACT

A method and a system is provided for monitoring an area by a monitoring camera (1). A protected zone (5) is defined within the monitored area (2) and a suspicious object (9a, 9b) is detected as an object present both inside and outside the protected zone. A key position of the suspicious object is determined, and it is determined if the key position is inside or outside the protected zone (5). If the key position is outside the protected zone a first action is triggered.

14 Claims, 2 Drawing Sheets

MONITORING METHOD AND CAMERA

CROSS REFERENCE TO RELATED APPLICATION

This application claims the benefit of EPC Application No. 12192217.3, filed Nov. 12, 2012 and U.S. provisional application No. 61/726,812, filed Nov. 15, 2012, which are incorporated herein by reference as if fully set forth.

TECHNICAL FIELD

The present invention relates to a method and a system for monitoring an area by a monitoring camera.

BACKGROUND

Surveillance cameras are currently used in many different applications, for monitoring environments both indoors and outdoors. Cameras may e.g. be used for monitoring areas where a person is serving customers from behind a counter, and where the inside of the counter may be used as storage for items or equipment where access should be restricted to the person manning the counter. Examples of such environments could be hotel front desks, bank office counters, reception desks, bars, fast food counters, cashier desks at gas stations, or check-in counters at airports. Another example is shops or boutiques selling perfume, jewelry or wrist watches over a staffed counter. When the person working at the desk or counter is serving a customer, it might be difficult for him or her to keep track of other persons approaching the desk and potentially trying to gain access to items and equipment only meant to be handled by the person working at the counter. It would be therefore be desirable to provide improved solutions for assisting staff manning a counter to prevent unauthorized access to areas behind the counter.

SUMMARY OF THE INVENTION

In view of the above, it is thus an object of the present invention to provide an improved method of monitoring an area, such as a retail counter.

According to a first aspect of the invention a method of monitoring an area by a monitoring camera is provided, which comprises the steps of defining a protected zone within the monitored area, detecting a suspicious object as an object present both inside and outside the protected zone, determining a key position of the suspicious object, determining if the key position is inside or outside the protected zone, and if the key position is outside the protected zone, triggering a first action.

Using this method it is possible to monitor an area around a counter in an efficient and non-intrusive manner, allowing rules to be set up allowing only objects with certain properties access to certain areas. In other words, the method makes it possible to easily and efficiently set up position discriminating rules for objects. The method is flexible and can be adapted to different monitoring scenarios as well as to various different practical implementations.

The method may further comprise the step of defining an occlusion zone within the monitored area, wherein the first action comprises performing the steps of determining if the key position is outside the occlusion zone, and if the key position is outside the protected zone and outside the occlusion zone, triggering a second action. This introduces additional possibilities to tailor the method to different monitoring scenarios, such as where it is desired to allow entry into the protected zone from a certain direction.

The step of defining a protected zone may comprise detecting boundaries of a physical element surrounding at least part of the protected zone. In that way it is possible to perform an automatic set-up of the monitoring system, by letting the system detect boundaries of a counter and defining the protected zone as e.g. the area behind the counter or the volume inside the counter.

Additionally or alternatively the step of defining a protected zone may comprise accessing coordinates of a predefined protected zone. In this way a user may draw the limits of a protected zone e.g. in a graphical user interface which provides a user-friendly way of setting up the system. This may be combined with the automatic detection of boundaries of a physical element, e.g. by the user confirming the detected boundaries via a user interface.

The step of defining a protected zone may comprise defining a three-dimensional protected volume, and the step of determining if the key position is inside or outside the protected zone may comprise determining if the suspicious object is inside or outside a two dimensional projection of the protected volume. This makes it possible to set the volume behind a counter and below its top surface as a protected zone and still be able to ignore a person standing behind the counter.

The step of detecting a suspicious object may comprise detecting object pixels inside the protected zone, and determining if an object to which the object pixels belong is present outside the protected zone. This provides an easily implemented and efficient method of detecting suspicious objects.

The step of determining a key position of the suspicious object may comprise setting the key position to a mean position of pixel coordinates of pixels included in the suspicious object. This provides an easily implemented and efficient method of finding the key position which can be used both for a three-dimensional and a two-dimensional object representation.

The step of determining a key position may comprise setting the key position to a position of a highest point of the suspicious object. This could be a convenient option in case a camera capable of height measurements is included in the monitoring system, i.e. an image sensor having three-dimensional imaging capabilities. The highest point position may be chosen as a mean or median value of the ten highest point positions of an object to increase robustness. The highest point of a person is usually his head, meaning that this would in most cases be a correct estimate of where the person is standing.

The step of determining a key position may comprise setting the key position to a position outside the protected zone if a predetermined percentage of pixels included in the suspicious object are outside the protected zone. This would be a convenient option both when a three-dimensional and when a two-dimensional representation of an object is available. It would also be a convenient option in case a thermal camera is used. The percentage could e.g. be chosen as 50% or 70% or any value determined e.g. by trial and error to give a correct estimation.

The step of determining a key position may comprise setting the key position to a position of a highest temperature of the suspicious object. The temperature of a person is usually highest in the head region which means that this would often be a correct estimation of where the body of a person is located. To increase robustness it would be possible to set the highest temperature position to a mean or median value of e.g. the ten highest temperature positions. It would also be possible to add other criteria such that the highest temperature would have to be surrounded by a region of reasonably high temperatures.

The step of determining a key position may comprise setting the key position to a position of a part of the suspicious object detected using a cascade of object classifiers, such as one of: a face, a head, a pair of shoulders, and a hat. This would make it possible to easily adapt the determination of the key position to a variety of different monitoring scenarios.

According to a second aspect of the invention a monitoring system for monitoring an area comprises a monitoring camera, a zone definition unit arranged to define a protected zone within the monitored area, a suspicious object detection unit arranged to detect a suspicious object as an object present both inside and outside the protected zone, an object position determination unit arranged to determine a key position of the suspicious object and to determine if the key position is inside or outside the protected zone, and an action trigger unit arranged to trigger a first action in case the key position is determined to be outside the protection zone.

The object position determination unit may comprise one or more of an object classifier unit, a height measurement unit or a heat measurement unit to determine an object classifier, a height of an object or a temperature of an object, in order to determine a key position of an object.

According to a third aspect of the invention a computer-readable recording medium has recorded thereon a program for implementing the method according to any one of claims 1-12 when executed on a device having processing capabilities.

The second and third aspects of the invention are both associated with the same advantages as described above in connection with the first aspect. A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several devices, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
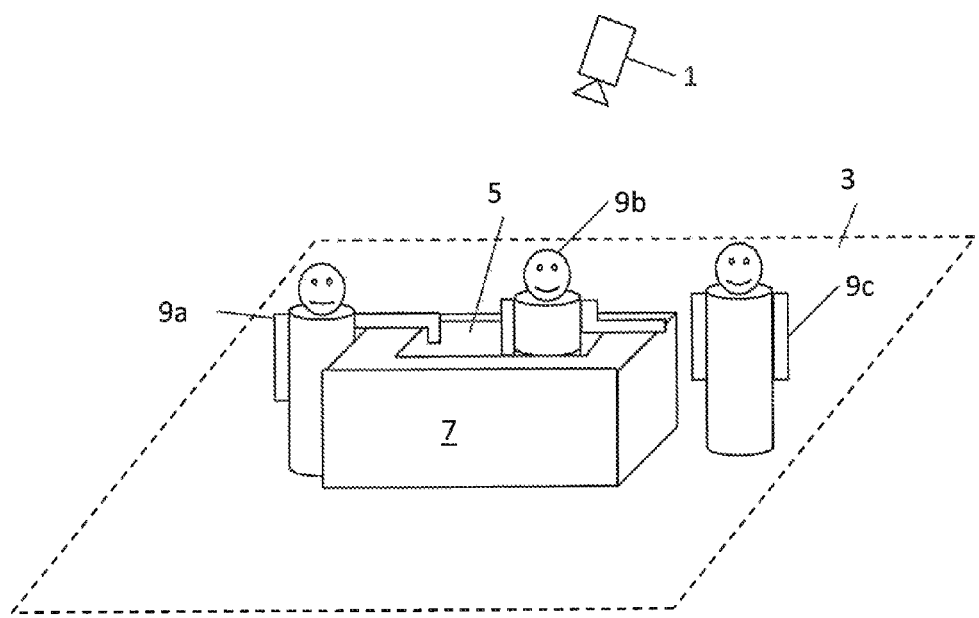
FIG. 1 shows a monitoring camera monitoring an area.

FIG. 1 illustrates an exemplifying situation where a monitoring camera 1 is arranged to monitor an area 3. The monitoring camera 1 could symbolize a group of monitoring cameras with differing imaging capabilities or a camera including several image sensors. The camera or cameras may e.g. include an image sensor capturing visible light images, a thermal sensor producing images of the temperature within the monitored area, or an image sensor capturing three-dimensional images, e.g. a TOF, time-of-flight, image sensor which gives an image of distance to different pixels, from which it is possible to calculate the depth or height of the monitored area and objects therein.

Figure 2:
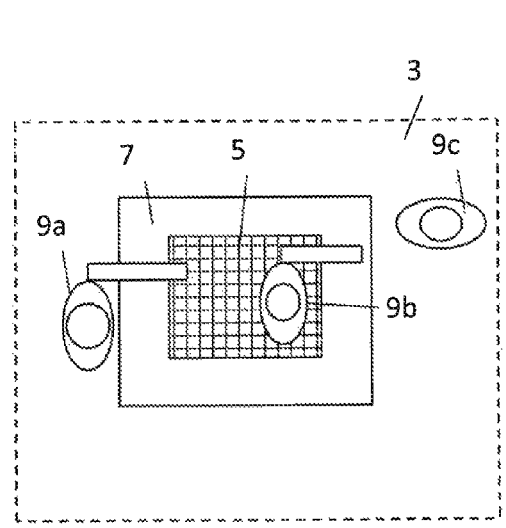
FIG. 2 illustrates the monitored area from above.

The monitored area 3 includes a protected zone 5, in the illustrated example defined by a physical element 7, e.g. in the form of a counter. Objects 9a, 9b, and 9c are present within the monitored area 3. FIG. 2 is a view from above of the situation illustrated in FIG. 1. In other words, FIG. 2 schematically illustrates an image captured by the camera 1. It may be noted that the protected zone may be defined by one or more planes, in case a monitoring system with three-dimensional imaging capabilities is used or by one or more lines in case a monitoring system with two-dimensional imaging capabilities is used.

In the situation shown in FIGS. 1 and 2 a customer with doubtful intentions, object 9a, is standing next to the counter 7 and reaching into the area behind the counter, the protected zone 5, e.g. in order to gain access to expensive products only sold over counter. Object 9b, symbolizing a clerk manning the counter, is engaged in conversation with another customer, object 9c. Object 9b is therefore not aware that object 9a is gaining unauthorized access to items behind the counter.

According to the methods and apparatuses presented herein, thefts from behind a counter may be prevented by analyzing images, captured by the monitoring camera, to, in a first step, find objects that are present both inside and outside the protected zone at the same time. Such object may be denoted suspicious object, as they are objects that require further analysis to determine if they are performing non-permitted actions.

The detection of suspicious objects may be performed in various ways. One option is to find any object pixels that are inside the protected zone, and then determine whether an object that is associated with those object pixels also exists outside the protected zone. The latter may e.g. be done by checking if there are other object pixels belonging to the same object and if any of those other object pixels are outside the protected zone.

A key position of the object, as discussed in more detail below, may also be used to directly determine both if the object exists outside the protected zone and if its key position is outside the protected zone.

Another option is to detect crossings of a line or a plane delimiting the protected zone 5. When such a line or plane is crossed, it may be assumed that an object is present both inside and outside the protected zone, in other words, the object that is associated with the crossing of the line or plane is a suspicious object and needs to be further investigated.

Returning to FIGS. 1 and 2, it is apparent that both object 9a and object 9b, the clerk, who is resting his arm on the counter and possibly reaching out over the counter e.g. to show a piece of merchandise to a customer 9c, would be determined to be suspicious objects. In order to ignore object 9b and only react on object 9a, the images are further analyzed to find a key position of each object that is present both inside and outside the protected zone, i.e. object 9a and 9b.

When a suspicious object is found to have a key position outside the protected zone, an action is triggered., e.g. in the form of a light or sound alarm, an entry into a log, a start of recording images from the camera, or other type of monitoring action, such as initiation of analysis of images or sensor inputs from e.g. another monitoring device. The term action as used herein should be interpreted in a broad sense, and should also be understood to incorporate actions such as a camera detecting an event, or the detected event being sent by the camera to e.g. a video analytics engine. Hence, in this example, an action would be triggered for object 9a. When it comes to the clerk, object 9b, as his key position is inside the protected zone, no action will be triggered. For sake of completeness it might be noted that object 9c is only present outside the protected zone, thus, there is no need to find his key position.

The key position of an object is set to a position where it is likely that the main part of the body of the object is located or, in some sense, where the object is standing. Several different options exist for determining a key position of an object, and the different options may be combined in suitable ways to make the determination more correct.

One example is to calculate a mean value of the pixel coordinates of pixels determined to belong to a certain object, and setting the key position of that object to the calculated mean coordinate value. This can also be seen as determining a center of mass or center of gravity of the object, either in a two-dimensional area or in a three-dimensional space.

If a monitoring camera capable of determining the depth or height of objects in the monitored area is included in the monitoring system, it is possible to use a highest point of an object as its key position. The highest point of an object would in most cases be an accurate measure of where the head of an object is. If there is uncertainty regarding the correctness of the height measurement, the position of the highest point of the object could be set to the mean or median position of the coordinates of e.g. the ten highest points measured within the object, in order to increase robustness.

Another option is to decide that if a predetermined percentage of pixels included in a certain object is outside the protected zone, the key position of that object is outside the protected zone. This percentage may e.g. be 50% or 70% or another value which is deemed suitable for the purpose.

In case a heat sensitive camera is included in the monitoring system, the temperature of an object may be used to set the key position. The temperature of a person is normally highest in the head region, and hands and arms are usually colder. From this follows that the position of a highest temperature detected for an object may be used as the key position. It would also be possible to add criteria such as that the highest temperature has to be surrounded by an object region having reasonably high temperature, e.g. in order to distinguish from cases where a lit cigarette is held in the hand of the object. If there is uncertainty regarding the correctness of the temperature measurement, it would, just as for the highest point measurement, be possible to set the position of the highest temperature of the object to the median position of the coordinates of e.g. the ten highest temperatures measured within the object, in order to increase robustness.

The key position of an object may also be set to a position of a part of an object detected using a cascade of object classifiers. The object classifiers may e.g. be one of a face, a head, a pair of shoulders, a hat or a cap. The concept of object classifiers has been described e.g. in U.S. Pat. No. 7,099,510.

It may be noted that all of the described ways of determining a key position of an object would be useful both when capturing two-dimensional images and when capturing three-dimensional images including a depth coordinate.

The different methods for finding a key position of a suspicious object may be combined with each other, and may also be used in combination with information regarding a history of movement of an object if such is available. Typically, an object representing a person trying to gain unauthorized access to the area behind the counter will have a movement history approaching the counter within the area outside the protected zone. The store clerk working at the counter will typically have a movement history including various positions behind the counter. Another option is to combine the information regarding the key position of a suspicious object with different characteristics of the object, such as if a specific piece of clothing is worn only by store clerks this could be detected and used as an additional criteria to ignore an object which has been classified as a suspicious object.

Prior to the step of finding a suspicious object, the images captured by the camera may have been analyzed to separate the foreground from the background and the objects within the camera view may have been segmented using object segmentation.

When analyzing objects, situations may occur where it may be needed to split up two objects which have merged in an image analysis sense. This may e.g. be the case when a store clerk is shaking hands with a customer or handing an item to a customer. This may be avoided by adding the step of splitting up objects by "cutting off" any parts having the thickness of arms and belonging to objects with a key position outside the protected zone, and then counting the number of objects having the same class as the object pixels within the protected zone. If the number is larger than one, this is an indication that there were two objects that were merged, which most likely means that no attempted theft was taking place. If the number equals one, this is an indication that a theft was taking place and that an action should be triggered.

Figure 3:
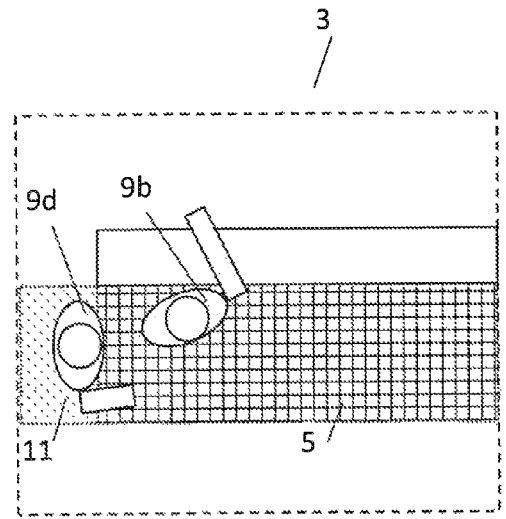
FIG. 3 illustrates another monitored area from above.

In FIG. 3 another situation is shown where additionally an occlusion zone 11 has been defined. This is useful in a situation where it is desired to allow an object to enter from a certain direction into the protected zone 5 without triggering an alarm action. In this case a first action is triggered when finding an object, in this case object 9d, which fulfills both of the above discussed conditions—being present both inside and outside of the protected zone and having its key position outside the protected zone. The first action is in this case to additionally check if the key position of the object is inside or outside the occlusion zone 11.

In the situation shown in FIG. 3, object's 9d key position is inside the occlusion zone 11, and therefore no second action would be triggered. In case object 9d would have had its key position outside the occlusion zone, a second action implying that an improper reaching into the protected zone had taken place would have been triggered, e.g. an action of the same type as in the above example described with reference to FIGS. 1 and 2.'

Figure 4:
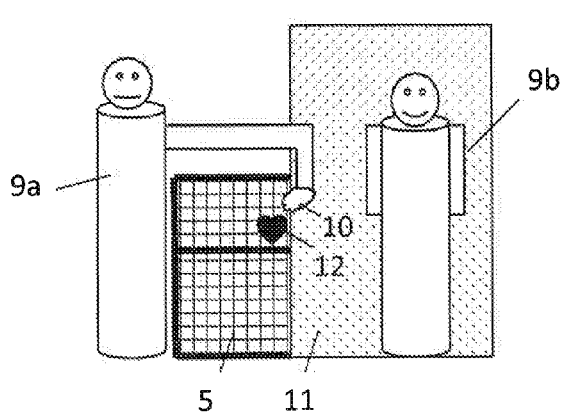
FIG. 4 illustrates yet another monitored area in a cross-sectional view.

In FIG. 4 yet another way of utilizing the ideas presented herein is illustrated. In FIG. 4 the protected zone is defined as the volume below the counter. Object 9a is trying to gain access to an item 12 stored in the counter. Object 9b, the person manning the counter, is looking in another direction and is unaware of the attempted theft. When object 9a reaches his hand 10 into the protected zone 5, he will be detected as a suspicious object and it will be checked if his key position is inside or outside the protected zone 5, and as it apparently is outside, an action will be triggered.

In order to distinguish allowed accesses to the inner space of the counter, typically by the store clerk 9b, from attempted thefts, the space or the area behind the counter has been defined as an occlusion zone 11. The action which is triggered when object's 9a hand is reached into the protected zone will therefore be to additionally check whether the key position of the suspicious object is within the occlusion zone 11. In FIG. 4 this is not the case, and, thus, another action will be triggered, e.g. a sound or light alarm, an entry into a log, or a start of a recording. In case it was object 9b who had been stretching a hand into the protected zone 5, no second action would have been triggered, as object 9b has a key position inside the occlusion zone.

Figure 5:
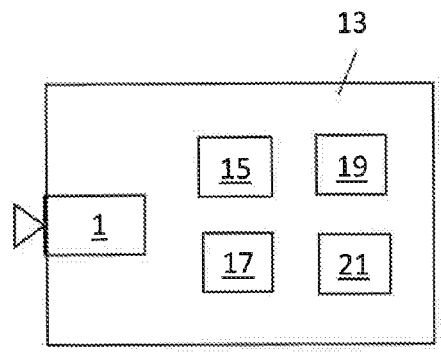
FIG. 5 shows a monitoring system

In FIG. 5 a monitoring system 13 is schematically illustrated. The monitoring system includes a monitoring camera 1 and a zone definition unit 15 arranged to define a protected zone 5 within the area 3 monitored by the monitoring camera 1. The protected zone 5 may e.g. be defined by the zone definition unit 15 using image analysis to detect boundaries of a physical element 7 surrounding at least part of the protected zone.

Another option is that the zone definition unit 15 accesses coordinates of a predefined protected zone. These coordinates may have been defined by a user in a user interface, e.g. by drawing in a graphical user interface or by the user entering coordinates. One option is to define a line crossing the monitoring area and defining the protected zone as the area on one side of the line. It would also be possible to define one or more planes delimiting the protected zone.

The protected zone may be defined either as an area or as a three dimensional space. The latter case would usually be combined with the use of a 3D-camera. In the example shown in FIGS. 1-3, the protected zone could then be defined as the space behind the counter, and below the level corresponding to the upper surface of the counter. In FIG. 4, the protected zone is, as already mentioned, defined as the inner space of the counter.

In case a three-dimensional protected zone is defined, it may be appropriate to use its two-dimensional projection when determining if the key position of a suspicious object is inside or outside of it. Whether or not to use the two-dimensional projection would be decided based on how the three-dimensional protected zone is defined. E.g. in case the protected zone in FIG. 1 is defined as the volume behind the counter and below the level of its surface, it would probably be more convenient to use its two-dimensional projection when determining whether the suspicious object key position is inside or outside the protected zone. Object 9b would then with certainty have a key position inside the protected zone, which may not be the case if the three-dimensional representation of the protected zone is used.

An occlusion zone may be defined in the same manner as the protection zone by the zone definition unit 15. It may be noted that more than one occlusion zone may be used, e.g. if it is desired to allow entrance to a protected zone behind a counter from more than one direction.

The monitoring system also includes a suspicious object detection unit 17 which uses image data from the camera 1 and data regarding the defined protected zone 5 to detect a suspicious object as an object present both inside and outside the protected zone. When such an object is found, an object position determination unit 19 is provided to determine the key position of the suspicious object and determine if that key position is outside or inside the protected zone 5.

Finally an action trigger unit 21 is provided which triggers an action in case the key position is determined to be outside the protection zone. As described above, this action may a light or sound alarm, an entry into a log, or a start of a recording session. In case an occlusion zone 11 is defined, the action (first action) would be to initiate a check by the object position determination unit 19 to see if the key position is inside or outside the occlusion zone 11. The action trigger unit 21 would in that case be adapted to trigger a second action in case it is determined that the key position of the suspicious object is also outside the occlusion zone, and that second action could then e.g. be a light or sound alarm, an entry into a log, a start of a recording session.

The units 15, 17, 19, 21 may be implemented in either hardware or software, or a combination thereof. It would be possible to provide the units 15, 17, 19, 21 in the monitoring camera, e.g. in the form of software run on a processor in the monitoring camera or as hardware included in the monitoring camera. One or more of the units 15, 17, 19, 21 may also be arranged in a separate device, and they may also be split on several devices.

Figure 6:
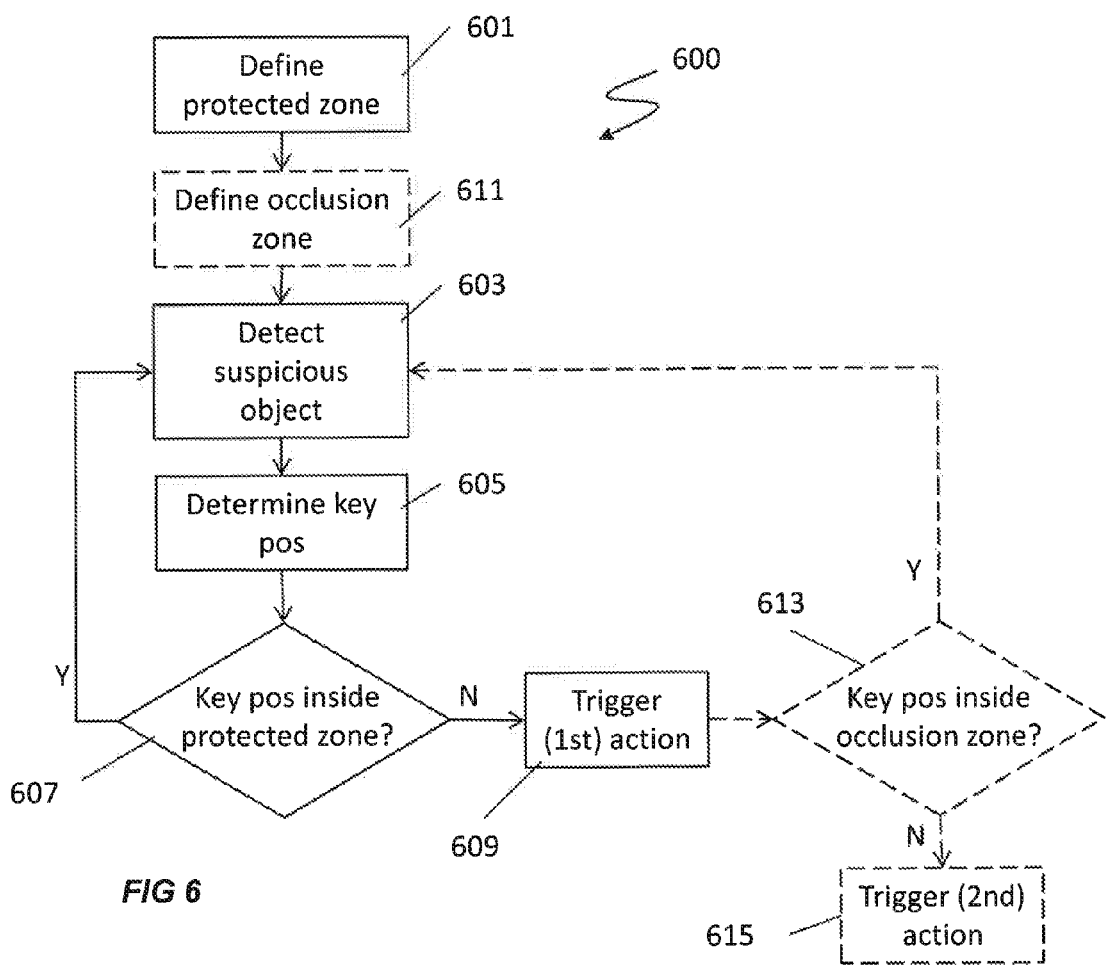
FIG. 6 illustrates a method of monitoring an area. .

In FIG. 6 a method 600 according to embodiments of the invention is illustrated. In a first step 601, a protected zone is defined. In a second step 603, a suspicious object is detected as an object which is present both inside and outside the protected zone.

In the next step 605, a key position of the suspicious object is detected, and in step 607 it is determined if the key position is inside or outside the protected zone. If the key position is outside the protected zone, a first action is triggered in step 609. As mentioned above, this action may e.g. be a sound or light alarm, an entry into a log or a start of a recording of images. In case the key position is inside the protected zone, the method may either, as illustrated in FIG. 6, go back to step 603 of detecting a suspicious object, or it may go back to step 601 and define a protected zone in a different manner. Another option is to go back to step 605 and determine the key position of another suspicious object which may have been detected earlier in step 603.

In case an occlusion zone is used, this zone will be defined in step 611, and the action—a first action—triggered in step 609 will be to check, in step 613, if the key position is inside or outside the occlusion zone. If the key position is determined to be outside the occlusion zone, another action—a second action—will be triggered in step 615. This second action may e.g. be a sound or light alarm, an entry into a log or a start of a recording of images or any other action as mentioned above in relation to situations without an occlusion zone.

In case the key position is inside the occlusion zone, no action is triggered and the method may, as illustrated in FIG. 6, go back to step 603 of detecting a suspicious object, or it may go back to step 601 and define a protected zone in a different manner, or it may go back to step 611 and define an occlusion zone in a different manner. Another option is to go back to step 605 and determine the key position of another suspicious object which may have been detected earlier in step 603.

It will be appreciated that a person skilled in the art can modify the above-described embodiments in many ways and still use the advantages of the invention as shown in the embodiments above. It may e.g. be noted that the extension of the ideas presented herein to the use of more than one protected zone would be straightforward.

In case more than one monitoring camera, or image sensor is present, e.g. if a visible light camera and a thermal camera or a 3D-camera is present, it would be possible to define the protection zone using the visible light camera and the switch to using the thermal camera or the 3D-camera for the detection of objects and the key position analysis.

Thus, the invention should not be limited to the shown embodiments but should only be defined by the appended claims.

LIST OF REFERENCE NUMERALS

1: Monitoring camera
3: Monitored area
5: Protected zone
7: Physical element
9a-d: Objects
10: Hand of object
11: Occlusion zone
12: Item stored in counter
13: Monitoring system
15: Zone definition unit
17: Suspicious object definition unit
19: Object position determination unit
21: Action trigger unit

The invention claimed is:

1. A method of monitoring an area by a monitoring camera, comprising the steps of:
   defining a protected zone within the monitored area,
   detecting a suspicious object as an object present both inside and outside the protected zone,
   determining a key position of the suspicious object,
   determining if the key position is inside or outside the protected zone, and if the key position is outside the protected zone, triggering a first action, wherein:
   the key position of the suspicious object is a position where the main part of the body of the object is located or where the object is standing,
   the step of defining the protected zone comprises defining a three dimensional protected volume, and
   the step of determining if the key position is inside or outside the protected zone comprises determining if the key position is inside or outside a two dimensional projection of the protected volume.

2. The method of claim 1, further comprising the step of:
   defining an occlusion zone within the monitored area, and
   wherein the first action comprises performing the step of determining if the key position is outside the occlusion zone, and, if the key position is outside the occlusion zone, triggering a second action,
   wherein the occlusion zone is a part of the monitored area defining an allowed entry into the protected zone from a certain direction.

3. The method of claim 1, wherein the step of defining a protected zone comprises detecting boundaries of a physical element surrounding at least part of the protected zone.

4. The method of claim 1, wherein the step of defining a protected zone comprises accessing coordinates of a predefined protected zone.

5. The method of claim 1, wherein the step of detecting a suspicious object comprises detecting object pixels inside the protected zone, and determining if an object to which the object pixels belong is present outside the protected zone.

6. The method according to claim 1, wherein the step of determining a key position of the suspicious object comprises setting the key position to a mean position of pixel coordinates of pixels included in the suspicious object.

7. The method according to claim 1 wherein the step of determining a key position comprises setting the key position to a position of a highest point of the suspicious object.

8. The method according to claim 1, wherein the step of determining a key position comprises setting the key position to a position outside the protected zone if a predetermined percentage of pixels included in the suspicious object are outside the protected zone.

9. The method according to claim 1, wherein the step of determining a key position comprises setting the key position to a position of a highest temperature of the suspicious object.

10. The method according to claim 1, wherein the step of determining a key position comprises setting the key position to a position of a part of the suspicious object detected using a cascade of object classifiers.

11. The method according to claim 1, wherein the part of the suspicious object detected using a cascade of object classifiers is one of: a face, a head, a pair of shoulders, and a hat.

12. A non-transitory computer-readable recording medium having recorded thereon a program for implementing the method according to claim 1 when executed on a device having processing capabilities.

13. A monitoring system for monitoring an area, comprising:
   a monitoring camera,
   a zone definition unit arranged to define a protected zone within the monitored area,
   a suspicious object detection unit arranged to detect a suspicious object as an object present both inside and outside the protected zone,
   an object position determination unit arranged to determine a key position of the suspicious object and to determine if the key position is inside or outside the protected zone, and
   an action trigger unit arranged to trigger a first action in case the key position is determined to be outside the protection zone, wherein:
   the key position of the suspicious object is a position where the main part of the body of the object is located or where the object is standing,
   the zone definition unit is arranged to define a three dimensional protected volume, and
   the object position determination unit is arranged to determine if the suspicious object is inside or outside a two dimensional projection of the protected volume.

14. The monitoring system of claim 13, wherein the object position determination unit comprises one or more of:
   an object classifier unit,
   a height measurement unit,
   a heat measurement unit.

* * * * *